United States Patent
Bangalore

(10) Patent No.: US 9,741,338 B2
(45) Date of Patent: *Aug. 22, 2017

(54) SYSTEM AND METHOD FOR MACHINE-MEDIATED HUMAN-HUMAN CONVERSATION

(71) Applicant: Nuance Communications, Inc., Burlington, MA (US)

(72) Inventor: Srinivas Bangalore, Morristown, NJ (US)

(73) Assignee: Nuance Communications, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/963,479

(22) Filed: Dec. 9, 2015

(65) Prior Publication Data

US 2016/0093296 A1    Mar. 31, 2016

Related U.S. Application Data

(63) Continuation of application No. 13/311,852, filed on Dec. 6, 2011, now Pat. No. 9,214,157.

(51) Int. Cl.
*G10L 17/22* (2013.01)
*G10L 15/07* (2013.01)
(Continued)

(52) U.S. Cl.
CPC ........ *G10L 15/075* (2013.01); *G10L 15/1822* (2013.01); *G10L 15/197* (2013.01);
(Continued)

(58) Field of Classification Search
CPC ................. G10L 17/00; G10L 17/22
See application file for complete search history.

(56) References Cited

U.S. PATENT DOCUMENTS

| 5,864,805 A * | 1/1999 | Chen | G10L 15/22 704/235 |
|---|---|---|---|
| 6,272,456 B1 * | 8/2001 | de Campos | G06F 17/275 704/8 |

(Continued)

OTHER PUBLICATIONS

Hieronymus et al., "Open Microphone Speech Understanding; Correct Discrimination of in Domain Speech," in *IEEE International Conference on Acoustics, Speech, and Signal Processing, ICASSP 2006*, vol. 1.

*Primary Examiner* — Douglas Godbold

(57) ABSTRACT

Disclosed herein are systems, methods, and non-transitory computer-readable storage media for processing speech. A system configured to practice the method monitors user utterances to generate a conversation context. Then the system receives a current user utterance independent of non-natural language input intended to trigger speech processing. The system compares the current user utterance to the conversation context to generate a context similarity score, and if the context similarity score is above a threshold, incorporates the current user utterance into the conversation context. If the context similarity score is below the threshold, the system discards the current user utterance. The system can compare the current user utterance to the conversation context based on an n-gram distribution, a perplexity score, and a perplexity threshold. Alternately, the system can use a task model to compare the current user utterance to the conversation context.

20 Claims, 3 Drawing Sheets

(51) Int. Cl.
  *G10L 15/18* (2013.01)
  *G10L 15/197* (2013.01)
  *G10L 25/84* (2013.01)
  *G10L 15/20* (2006.01)
  *G10L 15/25* (2013.01)
  *G10L 15/22* (2006.01)

(52) U.S. Cl.
  CPC .............. *G10L 15/20* (2013.01); *G10L 15/25* (2013.01); *G10L 17/22* (2013.01); *G10L 25/84* (2013.01); *G10L 2015/223* (2013.01); *G10L 2015/228* (2013.01)

(56) References Cited

U.S. PATENT DOCUMENTS

| | | | |
|---|---|---|---|
| 7,634,406 B2 * | 12/2009 | Li | G10L 15/19 704/243 |
| 8,423,362 B2 * | 4/2013 | Chengalvarayan | B60R 16/0373 704/231 |
| 2002/0133354 A1 | 9/2002 | Ross et al. | |
| 2003/0105637 A1 * | 6/2003 | Rodriguez | G06F 17/2735 704/270 |
| 2004/0083092 A1 | 4/2004 | Valles | |
| 2004/0176958 A1 * | 9/2004 | Salmenkaita | H04M 1/72561 704/275 |
| 2004/0220809 A1 * | 11/2004 | Wang | G06F 17/2705 704/257 |
| 2005/0144009 A1 * | 6/2005 | Rodriguez | G06F 17/2735 704/275 |
| 2006/0009965 A1 * | 1/2006 | Gao | G06F 17/2715 704/9 |
| 2006/0036444 A1 * | 2/2006 | Hwang | G10L 15/063 704/275 |
| 2006/0074671 A1 | 4/2006 | Farmaner et al. | |
| 2006/0129397 A1 * | 6/2006 | Li | G10L 15/19 704/245 |
| 2006/0293874 A1 | 12/2006 | Zhang et al. | |
| 2007/0038436 A1 | 2/2007 | Cristo et al. | |
| 2008/0215320 A1 * | 9/2008 | Wu | 704/231 |
| 2008/0221871 A1 * | 9/2008 | Braben | A63F 13/10 704/9 |
| 2008/0235023 A1 * | 9/2008 | Kennewick | G10L 15/22 704/257 |
| 2008/0319751 A1 * | 12/2008 | Kennewick | G10L 15/22 704/257 |
| 2009/0018829 A1 * | 1/2009 | Kuperstein | G10L 15/26 704/235 |
| 2009/0052635 A1 | 2/2009 | Jones et al. | |
| 2009/0292539 A1 | 11/2009 | Jaroker | |
| 2009/0299752 A1 * | 12/2009 | Rodriguez | D06F 58/28 704/275 |
| 2011/0131036 A1 | 6/2011 | DiCristo et al. | |
| 2011/0161080 A1 * | 6/2011 | Ballinger | G10L 15/30 704/235 |
| 2011/0191099 A1 * | 8/2011 | Farmaner | G10L 15/193 704/9 |
| 2011/0304774 A1 * | 12/2011 | Latta | G06F 17/30784 348/699 |
| 2012/0035931 A1 * | 2/2012 | LeBeau | G10L 15/265 704/251 |
| 2012/0053936 A1 * | 3/2012 | Marvit | G10L 15/26 704/235 |
| 2012/0209606 A1 * | 8/2012 | Gorodetsky | G10L 15/26 704/235 |
| 2012/0245923 A1 * | 9/2012 | Brun | G06F 17/2735 704/9 |
| 2013/0054238 A1 * | 2/2013 | Bodell | G10L 15/22 704/235 |

* cited by examiner

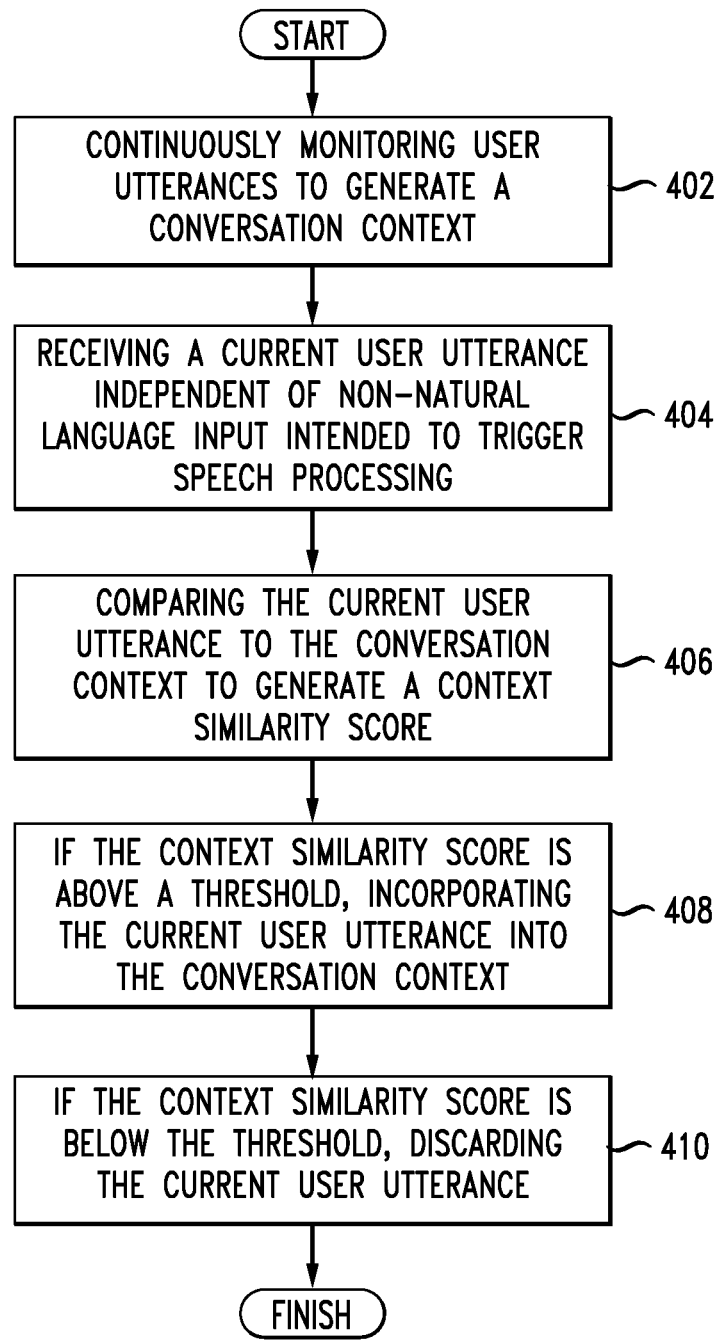

SYSTEM AND METHOD FOR MACHINE-MEDIATED HUMAN-HUMAN CONVERSATION

PRIORITY INFORMATION

The present application is a continuation of U.S. patent application Ser. No. 13/311,852, filed Dec. 6, 2011, the contents of which is incorporated herein by reference in its entirety.

BACKGROUND

1. Technical Field

The present disclosure relates to speech processing and more specifically to using conversation context to determine which portions of continuously monitored speech are relevant.

2. Introduction

One of the challenges for speech-driven systems is to identify when the user's input is directed to the system as opposed to some other person in the vicinity of the system. Typically, a "push-to-talk" button on the user interface activates the microphone only when the user intends an input to the system. Similar approaches also rely on inputs that are functionally similar to a button press, such as pressing a touch-sensitive screen, uttering a key phrase, or some other explicit signal or event indicating that the user intends to direct speech input to the system. Upon receiving such input, the system activates the microphone or other speech input device and begins receiving speech.

However, this approach limits the functionality of such human-machine interaction systems to wait for the entire user's input before acting on the input speech. Also, in machine-mediated human-human conversations, users have to take turns "switching on" and "switching off" the microphone manually, which leads to a tedious and cumbersome conversation. Further, users may forget to manually activate the microphone, leading to frustration, confusion, and lost time. These difficulties hinder the widespread adoption and use of speech interfaces.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The principles set forth herein allow for the microphone to be switched on all the time and for the system to figure out if the user's input was indeed directed to the system or to someone else in the vicinity of the system. Further, this approach allows for natural and intuitive machine-mediated human-human conversation such as in speech translation systems as well as human-machine interactions as is the case in the speech-driven information access solutions. This approach allows the system to operate in a way that is more familiar to users and also more similar to users' ears, in that users do not 'turn on' their ears to begin collecting audio. This approach allows the system to intelligently determine which audio input is directed to the system and which audio input is not directed to the system. For example, if the microphone picks up background noise, the system can determine that the background noise is not directed to the system and should be ignored for purposes of speech recognition and modeling conversation context.

A natural interface for speech-driven systems is to allow for the microphone to be listening all the time. However, current technologies do not permit such a setting. Even with sophisticated beam forming microphones and echo/noise cancellation techniques to suppress the noise from the signal, the speech recognizers receive audio input from the environment which is not intended for the system. These unexpected audio inputs result in misrecognitions and subsequent error spiral down of the human-machine interaction in such systems.

The solution is that the speech recognition not only models the current utterance but also has a model of the dialog that has been transpiring between the two human-human users and/or between the human and the machine. This conversation context model is like a language model, but instead models the things that have been said so far, with the expectation that the next utterances to be said should somehow fit well with what has been said so far. This modeling of the conversation context allows the speech recognition system to discard audio which is not compatible with the dialog context so far, i.e. which is not directed to the speech recognition system. The system can determine whether an utterance is incoherent to the current context, such as an interjection, the start of a completely new topic, or any other utterance that doesn't fit well with the conversation context at the moment. Thus if the context utterances were "Walmart in Morristown, N.J.", "plumbers" etc., then an utterance like "honey, please pass me the salt" is unlikely to be intended for the system because it deviates sharply from the context of the previous statements. Thus, the system can discard or ignore that statement.

This approach incorporates a model of the conversation context. In one example, the system computes an n-gram distribution for the utterances in the context and computes the perplexity of the current utterance with respect to that context n-gram model. Perplexity is a measure of how well the preceding conversation context predicts the next utterance. Using a threshold on the perplexity score, the system decides if the new utterance is a continuation of the current dialog context or if the utterance is not intended for the system to interpret. If the utterance is indeed a continuation of the context then the system incorporates the utterance in the context model for the next utterance and updates the n-gram model appropriately.

This model of rejection is complementary to the traditional ways of suppressing noise and can be used in conjunction with them to improve rejection accuracy. This solution enables a speech-driven conversational system in which users do not use a "push-to-talk" button or other explicit signaling to control the microphone. The microphone is turned on and continuously monitoring for speech all the time and the speech recognition engine decides which inputs to pay attention to and which inputs to discard based on an on-going model of the conversational context.

Disclosed are systems, methods, and non-transitory computer-readable storage media for processing continuously monitored speech input based on a conversation context. A system configured to practice the method monitors user utterances to generate a conversation context. The conversation context can be generated using speech recognition and/or incorporating context information from one or more non-speech sources. The system can continuously monitor user utterances without a triggering event, such as a user pressing a "push-to-talk" button or uttering a specific key word or phrase to engage speech recognition. The user utterances can originate from one or more user. The conversation context can describe at least part of a human-human dialog and/or a human-machine dialog.

Then the system receives a current user utterance independent of non-natural language input intended to trigger speech processing, and compares the current user utterance to the conversation context to generate a context similarity score. If the context similarity score is above a threshold, the system incorporates the current user utterance into the conversation context, and if the context similarity score is below the threshold, the system discards the current user utterance. The threshold can be static or dynamic. The type and/or settings of the threshold can be based on a user, a topic, the conversation context, confidence scores, and/or background noise. When monitoring user utterances, the system can apply a noise suppression mechanism.

The system can compare the current user utterance to the conversation context by computing an n-gram distribution for the user utterances in the conversation context, and computing a perplexity of the current user utterance based on the n-gram distribution. If, based on a perplexity threshold, the current user utterance is a continuation of the conversation context, the system can incorporate the current user utterance into the conversation context and update the n-gram distribution based on the current user utterance. If, based on the perplexity threshold, the current user utterance is not a continuation of the conversation context, the system can discard the current user utterance.

Alternately, the system can compare the current user utterance to the conversation context based on a task model associated with a specific task, such as a conversation structure, a grammar, and a dictionary.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates an example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for processing natural language using continuously monitored speech based on a conversation context. A brief introductory description of a basic general purpose system or computing device in FIG. 1 which can be employed to practice the concepts is disclosed herein. A more detailed description of context-based natural language processing of continuously monitored speech will then follow. These variations shall be discussed herein as the various embodiments are set forth. The disclosure now turns to FIG. 1.

Figure 1:
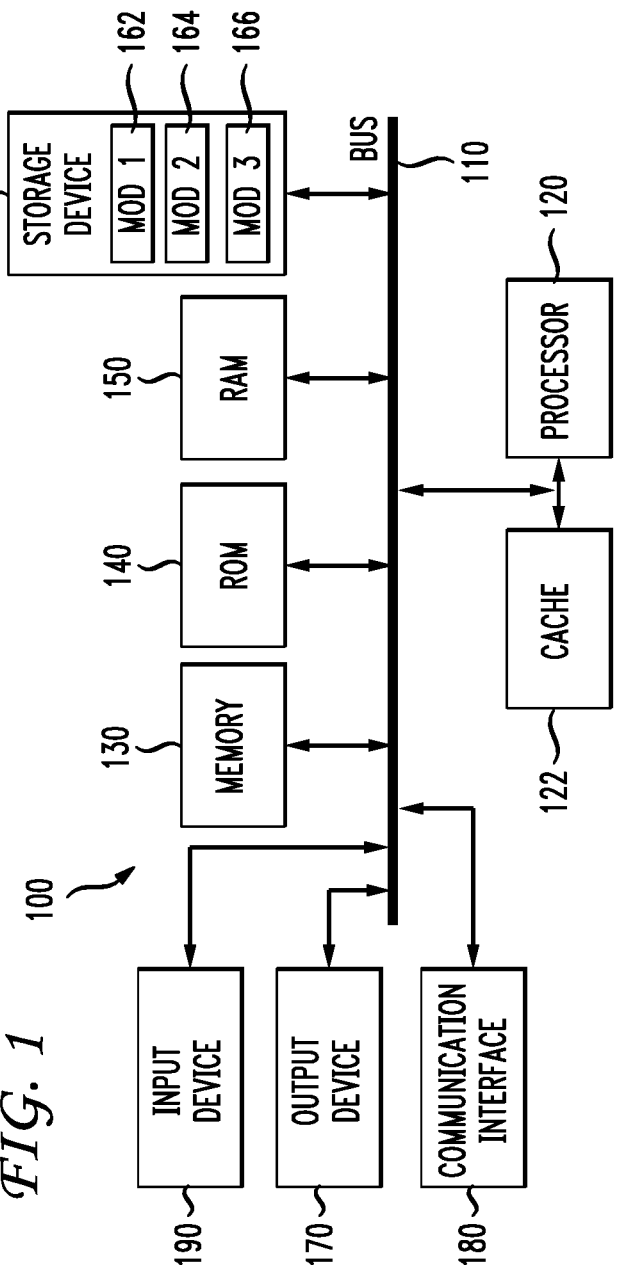
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
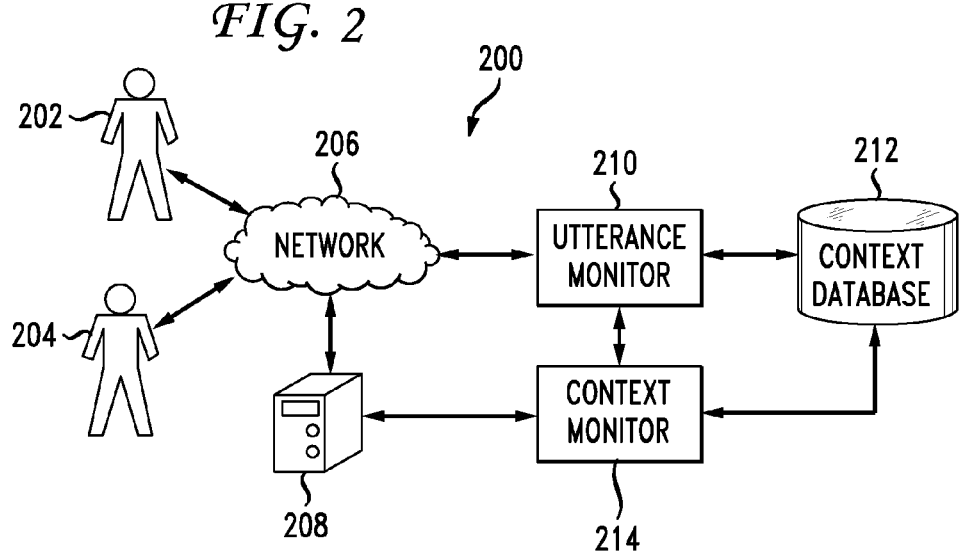
FIG. 2 illustrates an exemplary system configuration for machine-mediated processing of natural language conversation.

Having disclosed some components of a computing system, the disclosure now returns to a discussion of speech processing of continuously monitored speech using context information. FIG. 2 illustrates an exemplary system configuration 200 for machine-mediated processing of natural language conversation. In this configuration 200, an utterance monitor 210 monitors utterances of a user 202. The utterance monitor 210 can receive utterances captured via a local microphone or a remote microphone that captures audio and transmits the audio over a network 206. The utterance monitor 210 coordinates with a context monitor 214 to determine whether a received utterance is a continuation of an existing conversation. If the context monitor 214 determines that the utterance is part of an existing conversation, the context monitor 214 updates a context database 212 using the utterance, and transmits that information to a server 208. The server 208 can then decide how and whether to react to the utterance. For instance, the utterance may be a continuation of the conversation, but may not yet express sufficient data from which to interpret a command, but can provide sufficient data to influence the scope of a possible search query. Thus, the server 208 can either act directly on the utterance, or can use the utterance to prepare for an anticipated command or request.

For example, the user 202 is interacting with the server 208 via a speech interface to dictate an email to a co-worker. In the middle of dictation, another user 204 enters the room and hijacks the user's 202 attention. The utterance monitor 210 and/or the context monitor 214 can detect that the topic of the conversation changes as the user 202 interacts with the other user 204, and ignore or discard those utterances. During this time, the context database 212 can continue to maintain the email dictation context. After the user 202 and the other user 204 are done interacting, the user 202 can return to the email dictation and continue dictating the email. In this example, the user 202 can immediately resume dictating without explaining to the system how to handle the speech, and without providing some explicit signal such as a button press, gesture, or uttering a key phrase or 'hot' word.

This approach can also be applied to natural language interfaces other than speech, such as a chat room. The system can incorporate text processing for monitoring a chat room with multiple users and multiple simultaneous conversations occurring at once. The system can maintain different contexts for different sets of people, and sort out which statements go to which context. Then, the system can determine when users issue commands to or otherwise address the system and act on those commands. The system can also identify, extract, and/or reconstruct different conversations from a very busy and very complex chat room based on different contexts.

The system can store conversation contexts indefinitely. Alternately, the system can store conversation contexts until a timeout or inactivity period expires, such as 10 minutes, 24 hours, or 1 week. For example, if a user speaks to the system about planning a wedding, the conversation context can span multiple different sessions over weeks or months. Thus, it may be advantageous for the system to store this on-going, evolving conversation context for weeks or months. In one variation, the system can detect from source information about the conversation context an importance to the user. For very important topics, the system can store that context longer than more ephemeral contexts, such as a restaurant search. In another variation, the user can flag certain contexts as more important, and the user can even explicitly assign a context duration or expiration.

The system can maintain the conversation context and associate the conversation context with a particular user. The system can then save the conversation context when a user leaves the room, for example, and load the conversation context when that user returns to the room. Similarly, the system can associate the conversation context with a group of individuals. For example, the wedding planning conversation context above can be associated with the bride-to-be, the groom-to-be, and the mother of the bride-to-be. Thus, when all or part of that group is present, the system can load, restore, and/or use the conversation context for potential use with that group. The system can use speaker identification, face recognition, location data reported from a smartphone, and/or other approaches to identify which users are present and/or likely to speak.

The system can layer overlapping contexts of individuals and groups. For example, if two users are in a room together, the system can load a first context for the first user, a second context for the second user, and a third context for the combination of the two users. Then the system can analyze speech from the two users in light of those three contexts to determine to which context the speech applies, if any. Then, the system can maintain multiple parallel contexts for the users in the same room.

If the system determines that a user is trying to resume a previous context, the system can prompt the user to confirm that the user wants to resume the previous context. If the context is sufficiently similar to the currently received speech, the system can simply restore the context without prompting the user. If the context is only somewhat similar, but not sufficiently similar to exceed a certainty threshold, the system can prompt the user. Similarly, if the system detects that two stored contexts are similar to the received speech, the system can prompt the user to disambiguate between or select one of the two stored contexts. Further, the system can provide a summary or synopsis of the context, such as key words, a theme, a topic, or the last N utterances associated with the context, to provide the user with sufficient information to be able to accurately disambiguate or select a context. The user can instruct the system to merge two separately maintained contexts, such as if the user has started two separate contexts which have since become related, or if the system create two separate contexts for the same topic.

While the architecture 200 of FIG. 2 shows a single location, user utterances on a conversation context can span multiple locations and speech interface devices. For instance, the user can start a conversation associated with a conversation context in a first location, move to a second location with different equipment, and resume the conversation context in the second location. The utterance monitor 210, context monitor 214, and/or the context database 212 can be accessible via a network to any authorized devices and/or locations. In one aspect, locations and/or devices are authorized simply by receiving speech from the user.

Figure 3:
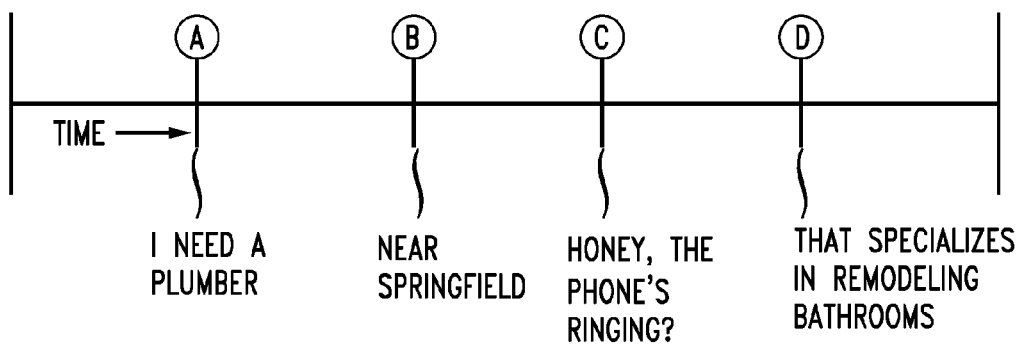
FIG. 3 illustrates a timeline of a sample natural language conversation.

FIG. 3 illustrates an example timeline of a sample natural language conversation between a user and a natural language processing system. In this example, time progresses from left to right. Thus, at point A, the user says to the system "I need a plumber". This initial utterance can help the system form a context for the conversation. For example, the system can form the initial context that extends beyond the phrase "I need a plumber" to include other related phrases, speech recognition grammars, and so forth. Then at point B, the user says "near Springfield". The system can determine that "near Springfield" is within a threshold distance of the on-going conversation context, so the system updates the context with that speech.

At point C, the user says "Honey, the phone's ringing!" The system can compare this utterance to the current, on-going conversation context. In this case, the utterance is unrelated to the current context, i.e. is outside a threshold distance from the conversation context. Thus, the system can ignore this utterance and continue to monitor user utterances. At point D, the user continues and says "that specializes in remodeling bathrooms". The system can determine that this utterance is a continuation of the current context, parse the combination of the speech at points A, B, and D to generate a query. The system can then generate a response to the query and output that response to the user.

Having disclosed some basic system components and concepts, the disclosure now turns to the exemplary method embodiment shown in FIG. 4. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

Disclosed are systems, methods, and non-transitory computer-readable storage media for processing continuously monitored speech input based on a conversation context. A system configured to practice the method continuously monitors user utterances to generate a conversation context (402). The conversation context can be generated using speech recognition and/or incorporating context information from one or more non-speech sources. The system can continuously monitor user utterances without a triggering event, such as a user pressing a "push-to-talk" button or uttering a specific key word or phrase to engage speech recognition. The user utterances can originate from one or more user. The conversation context can describe at least part of a human-human dialog and/or a human-machine dialog.

Then the system receives a current user utterance independent of non-natural language input intended to trigger speech processing (404), and compares the current user utterance to the conversation context to generate a context similarity score (406). If the context similarity score is above a threshold, the system incorporates the current user utterance into the conversation context (408), and if the context similarity score is below the threshold, the system discards the current user utterance (410). The threshold can be static or dynamic. The type and/or settings of the threshold can be based on a user, a topic, the conversation context, confidence scores, and/or background noise. When monitoring user utterances, the system can apply a noise suppression mechanism.

The system can compare the current user utterance to the conversation context by computing an n-gram distribution for the user utterances in the conversation context, and computing a perplexity of the current user utterance based on the n-gram distribution. If, based on a perplexity threshold, the current user utterance is a continuation of the conversation context, the system can incorporate the current user utterance into the conversation context and update the n-gram distribution based on the current user utterance. If, based on the perplexity threshold, the current user utterance is not a continuation of the conversation context, the system can discard the current user utterance. In a perplexity-based approach, the conversational context model can incorporate a language model built based on counting up all the n-grams, counting up all the words, counting up all the bi-grams and tri-grams, and computing the predictability of the new sentence, given the conversational model. If the predictability is low for an utterance, the system discards that utterance. If the predictability is high for the utterance, the system consumes the utterance, interprets the utterance, and assimilates the utterance into the conversation context for processing the next received speech.

The context can be tracked in other ways besides perplexity, as well. For instance, the system can compare the current user utterance to the conversation context based on a task model associated with a specific task, such as a conversation structure, a grammar, and a dictionary, such as an elaborate task model for a catalog ordering dialog for ordering a shower curtain. A task model can say that in a catalog ordering service, certain steps are likely to happen, such as verifying a customer ID, catalog numbers, shower curtain description, payment methods, shipping address, and so forth. This data provides a task structure. Utterances that don't fit that task structure are ignored. If an utterance fits the task structure, then the system processes the utterance. More precise, but still knowledge intensive way to capture context, but assumes a known structure and grammar or key words.

The system can also determine whether the user is addressing the system by using context modeling. For example, the system can track multimodal features such as gaze (i.e. eye direction), head pose or position, head orientation, hand gestures, and so forth. The system can include camera(s) or can analyze image data captured from external cameras or other devices. The system can determine, for example, whether or not user input is directed to the system by updating the conversation context based on visual features as well as the speech input. In one aspect, such visual features can influence the weight assigned to specific speech elements. For example, if the user is looking directly at the system and utters a phrase that does not fit the conversation context at all, the system can determine that the phrase is not part of the conversation context. Conversely, if the user is looking away from the system momentarily and utters a phrase that fits the context exceptionally well, the system can still incorporate that phrase into the conversation context and act on the phrase as necessary. In this way the visual features can influence how speech is incorporated into the conversation context.

These approaches can increase the efficiency and accuracy of speech recognition systems. For example, if the system maintains and/or relies on a continuously updated conversation context, the system can safely eliminate certain words and/or phrases from additional consideration. In one aspect, the system performs a rough or low-cost speech recognition algorithm on additional user utterances. Then the system compares the rough speech recognition output to the current conversation context to determine whether or not to apply additional, higher-cost speech recognition to the speech. In this manner, the conversation context can keep overall costs relatively low while still maintaining high-quality speech recognition for speech that is considered relevant to the conversation context.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to home use, education, public kiosks, retail, courtrooms, hands-free mobile devices, automobiles, military, and virtually any other scenario in which continuous monitoring and context information can enhance speech processing. Those skilled in the art will readily recognize various modifications and changes that may be made to the principles described herein without following the example embodiments and applications illustrated and described herein, and without departing from the spirit and scope of the disclosure.

I claim:
1. A method comprising:
    generating a conversation context model based on user utterances and facial recognition data, wherein the conversation context model comprises a model of a speech dialog occurring between a speech dialog system and a speaker;

continuously comparing the speech dialog to the conversation context model, to yield a context similarity score;

modifying the context similarity score based on a head orientation of the speaker, to yield a modified context similarity score;

when the modified context similarity score is above a threshold, incorporating a current user utterance into the conversation context model for use in the speech dialog; and when the modified context similarity score is one of equaling the threshold and below the threshold, suppressing the current user utterance such that the current user utterance is not incorporated into the conversation context model and the speech dialog produces speech as though the current user utterance is not in the conversation context model.

2. The method of claim 1, further comprising:
computing an n-gram distribution for the user utterances in the conversation context model;
computing a perplexity of the current user utterances based on the n-gram distribution;
when, based on a perplexity threshold, the current user utterance is a continuation of the conversation context model, incorporating the current user utterance into the conversation context model and updating the n-gram distribution based on the user utterance; and
when, based on the perplexity threshold, the current user utterance is not a continuation of the conversation context model, discarding the current user utterance.

3. The method of claim 1, wherein comparing the current user utterance to the conversation context model is based on a task model associated with a specific task.

4. The method of claim 3, wherein the task model indicates one of a conversation structure, a grammar, and a dictionary.

5. The method of claim 1, wherein the conversation context model is generated using a combination of speech recognition and a non-speech context source.

6. The method of claim 1, wherein user utterances are monitored without being triggered by a "push-to-talk" event.

7. The method of claim 6, wherein the "push-to-talk" event comprises explicit signaling to control a microphone.

8. The method of claim 1, wherein the conversation context model describes a human-human dialog.

9. The method of claim 1, wherein the conversation context model describes a human-machine dialog.

10. The method of claim 1, further comprising applying a noise suppression mechanism when monitoring the user utterances.

11. The method of claim 1, further comprising determining that the current user utterance is not intended to trigger the speech processing because of a deviation from the conversation context model which exceeds the threshold.

12. The method of claim 11, wherein the threshold is based on one of a user, a topic, the conversation context model, confidence scores, and background noise.

13. A system comprising:
a processor; and
a computer-readable storage medium having instructions stored which, when executed by the processor, cause the processor to perform operations comprising:
generating a conversation context model based on user utterances and facial recognition data, wherein the conversation context model comprises a model of a speech dialog occurring between a speech dialog system and a speaker;

continuously comparing the speech dialog to the conversation context model, to yield a context similarity score;

modifying the context similarity score based on a head orientation of the speaker, to yield a modified context similarity score;

when the modified context similarity score is above a threshold, incorporating a current user utterance into the conversation context model for use in the speech dialog; and when the modified context similarity score is one of equaling the threshold and below the threshold, suppressing the current user utterance such that the current user utterance is not incorporated into the conversation context model and the speech dialog produces speech as though the current user utterance is not in the conversation context model.

14. The system of claim 13, the computer-readable storage medium having additional instructions stored which, when executed by the processor, cause the processor to perform operations comprising:
computing an n-gram distribution for the user utterances in the conversation context model;
computing a perplexity of the current user utterance based on the n-gram distribution;
when, based on a perplexity threshold, the current user utterance is a continuation of the conversation context model, incorporating the current user utterance into the conversation context model and updating the n-gram distribution based on the current user utterance; and
when, based on the perplexity threshold, the current user utterance is not a continuation of the conversation context model, discarding the current user utterance.

15. The system of claim 14, wherein comparing the current user utterance to the conversation context model is based on a task model associated with a specific task.

16. The system of claim 15, wherein the task model indicates one of a conversation structure, a grammar, and a dictionary.

17. The system of claim 14, wherein the conversation context model is generated using a combination of speech recognition and a non-speech context source.

18. The system of claim 14, wherein user utterances are monitored without being triggered by a "push-to-talk" event.

19. The system of claim 14, wherein the conversation context model describes a human-human dialog.

20. A computer-readable storage device having instructions stored which, when executed by a computing device, cause the computing device to perform operations comprising:
generating a conversation context model based on user utterances and facial recognition data, wherein the conversation context model comprises a model of a speech dialog occurring between a speech dialog system and a speaker;
continuously comparing the speech dialog to the conversation context model, to yield a context similarity score;
modifying the context similarity score based on a head orientation of the speaker, to yield a modified context similarity score;

when the modified context similarity score is above a threshold, incorporating a current user utterance into the conversation context model for use in the speech dialog; and when the modified context similarity score is one of equaling the threshold and below the threshold, suppressing the current user utterance such that the current user utterance is not incorporated into the conversation context model and the speech dialog produces speech as though the current user utterance is not in the conversation context model.

\* \* \* \* \*